United States Patent
Willard et al.

(10) Patent No.: US 6,229,794 B1
(45) Date of Patent: May 8, 2001

(54) SELECTIVE CALL DEVICE AND METHOD FOR MONITORING AT LEAST TWO COMMUNICATION SYSTEMS

(75) Inventors: David F. Willard, Plantation; Eric T. Eaton, Lake Worth, both of FL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/373,652

(22) Filed: Aug. 13, 1999

(51) Int. Cl.[7] .............................. H04B 7/212; H04L 7/00
(52) U.S. Cl. ..................... 370/328; 375/356; 370/350
(58) Field of Search ...................... 370/314, 317, 370/319, 321, 322, 323, 324, 326, 328, 329, 330, 348, 350, 503, 337, 347; 375/356, 350; 455/502, 31.2

(56) References Cited

U.S. PATENT DOCUMENTS

| | | |
|---|---|---|
| 4,506,384 | 3/1985 | Lucas . |
| 5,537,415 * | 7/1996 | Miller et al. . |
| 5,712,624 * | 1/1998 | Ayerst et al. .................... 340/825.21 |
| 5,727,034 * | 3/1998 | Ojaniemi ............................... 375/356 |
| 6,016,322 * | 1/2000 | Goldman ............................... 370/508 |
| 6,141,535 * | 10/2000 | Ayerst ................................. 455/31.1 |

* cited by examiner

Primary Examiner—Chau Nguyen
Assistant Examiner—Chiho Andrew Lee
(74) Attorney, Agent, or Firm—Philip P. Macnak

(57) ABSTRACT

A selective call device (106) for monitoring at least two communication systems. The selective call device (106) has a receiver (204) for receiving information from a first communication system (110), a processor (206) for referencing a time slot assignment on the first communication system (110) to a common time base. The processor (206) calculates timing information relating a common time base and a transmitter (222) transmits the timing information to the second communication system (120) informing the second communication system (120) when to transmit information to the selective call device (106) with reference to the common time base.

14 Claims, 3 Drawing Sheets

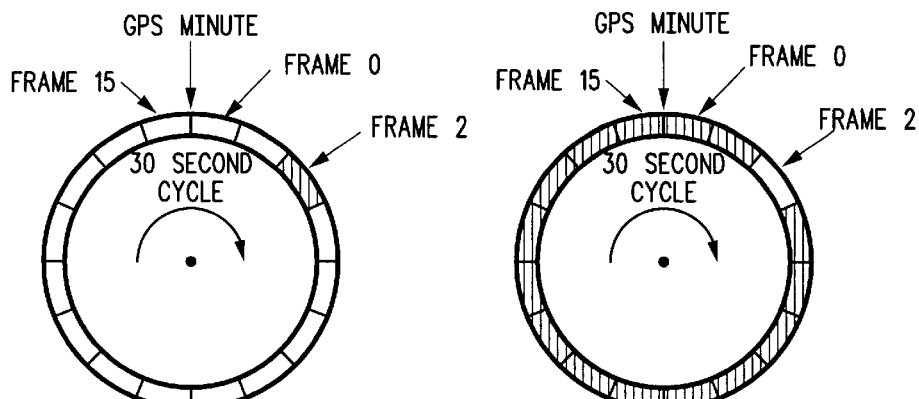
*FIG. 5*   *FIG. 6*
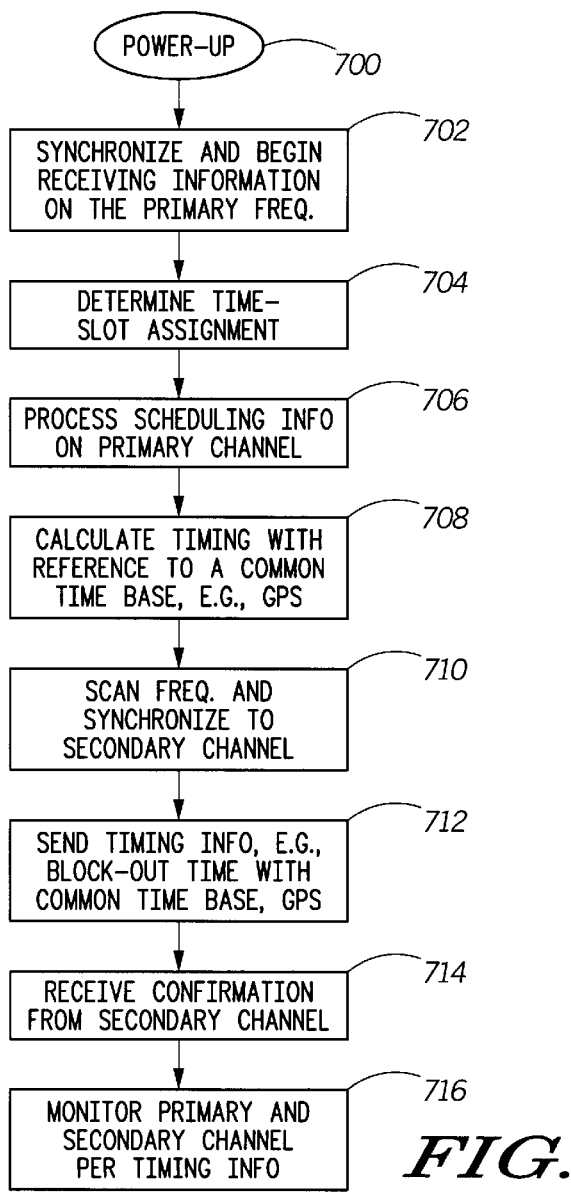
*FIG. 7*

SELECTIVE CALL DEVICE AND METHOD FOR MONITORING AT LEAST TWO COMMUNICATION SYSTEMS

FIELD OF THE INVENTION

This invention relates in general to communication systems, and more specifically to a selective call device and method for scheduling transmissions on different frequencies.

BACKGROUND OF THE INVENTION

There are many communication systems in operation today (including selective call systems) that provides message, data, and voice information. The communication subscriber units, e.g., selective call devices, utilize sophisticated receiver/transmitter architectures and signaling formats that have been optimized to provide both high receiver sensitivities and excellent battery saving capabilities.

In many metropolitan areas, there are many independent selective call communication systems or service providers. The selective call devices are able to scan a plurality of frequencies and select a frequency from the plurality of frequencies to monitor. An optimized battery saving protocol, e.g., the FLEX® family signaling protocol, enables selective call devices to remain connected for longer period of time without adversely affecting the user's expectation of battery life of the selective call device.

Receiving information on more than one frequencies or channels has always been an issue for most selective call signaling networks or systems since a selective call device can only monitor or receive information on one frequency or channel at a time. As generally the case, the two or more frequencies are independent networks or service providers that eliminates any coordination or scheduling of message transmission between the networks. Therefore, the networks will not know which frequency the selective call device is "listening" to at any given time. This problem is not resolved by prioritizing one network over the other because the lower priority network still does not know when the selective call device is monitoring the higher priority network. Thus, increasing the probability of missed messages.

Thus, what is need is a method and apparatus that enables a selective call device to receive messages on more than one network without missing messages and without communication or costly data transfer between independent networks.

BRIEF DESCRIPTION OF THE DRAWINGS

FIGS. 5 and 6 are timing cycles designating schedules for data transmissions on different frequencies in accordance with the preferred embodiment of the present invention.

FIG. 7 is a flow diagram illustrating a method for monitoring at least two frequencies in accordance with the preferred embodiment of the present invention.

DESCRIPTION OF A PREFERRED EMBODIMENT

Figure 1:
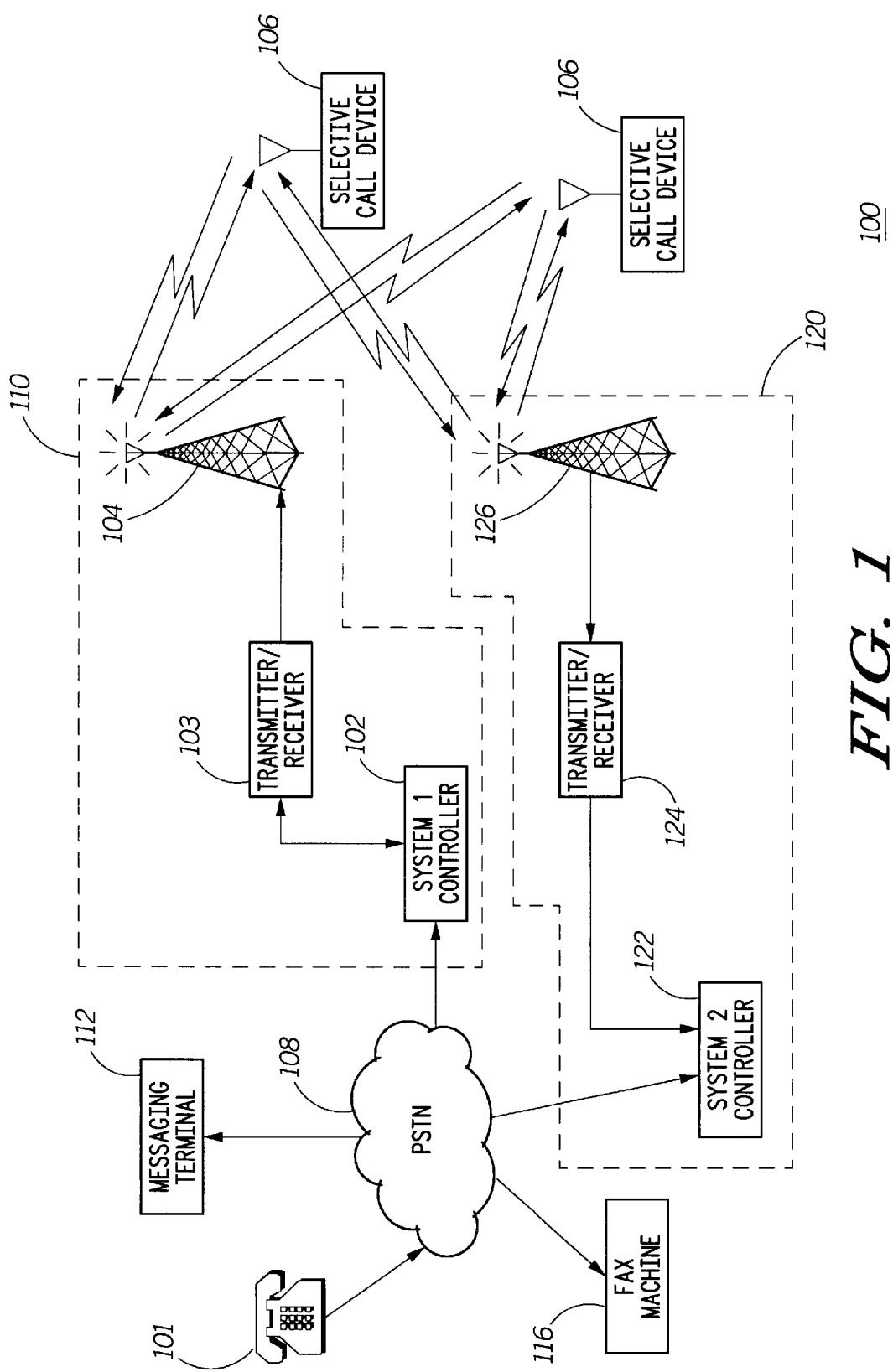
FIG. 1 is an electrical block diagram of a communication system in accordance with the preferred embodiment of the present invention.

Referring to FIG. 1, an electrical block diagram of a selective call or radio communication system 100 is shown in accordance with the preferred embodiment of the present invention. The selective call communication system 100 comprises at least two communication systems 110, 120 that transmit and receive selective call messages and data preferably independent of each other. Further according to the preferred embodiment of the present invention, the communication system 110 is a primary communication system 110 and the communication system 120 is a secondary communication system 120. The primary communication system 110 and the secondary communication system 120 do not need to communication among themselves. The primary communication system 110 can include, e.g., the communication system on which the selective call device 106 receives the majority of its information, including personal communication while the secondary communication system 120, e.g., comprises information services on which the user is able to request particular information or messages. As shown, the primary communication system 110 and the secondary communication system 120 are coupled or connected through a conventional public switched telephone network (PSTN) 108 by conventional telephone links. Preferably, the primary communication system 110 and the secondary communication system 120 are independent of each other. It can be appreciated that the primary and/or the secondary communication system 110, 120 can be coupled to other networks, e.g., satellites, microwaves or any other wireless or wireline communication system or protocol. Coupled to the PSTN 108 are message-input devices, e.g., conventional telephone 101, a facsimile machine 116 and/or a messaging terminal 112. The primary communication system 110 preferably operates according to the FLEX® protocol standard and includes a system controller 102 that oversees the operation of a plurality of radio frequency (RF) transmitter/receivers 103, through one or more communication links which, e.g., are twisted-pair telephone wires, and additionally can include RF, microwave, or other high quality audio communication links. The system controller 102 encodes and decodes inbound and outbound addresses into formats that are compatible with landline message switch computers. The system controller 102 also functions to encode and schedule outbound messages, which can include such information as analog voice messages, digital alphanumeric messages, graphics type data, and response commands, for transmission by the radio frequency (RF) transmitter/receivers 103 to a plurality of selective call devices 106. As shown, the selective call devices includes one-way and/or two-way devices but are preferably two-way communication devices including message transmission or response generally referred as acknowledge-back (ACKBACK). The system controller 102 further functions to decode inbound messages, including unsolicited and response messages received by the radio frequency transmitter/receivers 103 from the plurality of selective call devices 106. According to the preferred embodiment, these selective call devices 106 are able to operate on multiple frequencies and multiple protocols.

An example of an outbound alphanumeric message intended for a selective call device 106 is an alphanumeric selective call message entered from the messaging terminal 112. An example of an outbound analog message intended for a selective call device 106 is a voice page, numeric, or alphanumeric message entered from the telephone 101, messaging terminal 112 or FAX machine 116. Examples of response messages are acknowledgments and demand response messages. An acknowledgment, e.g., is an inbound message transmitted by or from a selective call device 106 which can indicate a successful reception of an outbound message or a request for information from the communication system. According to the preferred embodiment, the selective call device 106 can request information and provide a schedule for transmission. The schedule for transmission includes the period during which the secondary communication system should or is permitted to communicate with the selective call device 106. Similarly, the selective call device also transmits block-out periods during which the requested information should not be transmitted, e.g., from the secondary communication system 120. An example of a demand response message is a text message initiated by the selective call device 106, but which is not transmitted until after a demand response command is received from the system controller 102. The demand response command, in turn, was sent by the system controller 102 after an inbound message requesting permission to transmit the demand response message was communicated from the selective call device 106 to the system controller 102. A response message is transmitted by a selective call device 106 at a time scheduled by the system controller 102 and designated within an outbound demand message, or the demand response message is transmitted using an unscheduled technique which is a slotted ALOHA protocol, well known to one of ordinary skill in the art. When the demand response is transmitted using an ALOHA protocol, it is called a demand ALOHA response message. An unsolicited message is an inbound message transmitted by a selective call device 106 without having received an outbound message which requires a response. An example of an unsolicited message is an inbound message from a selective call device 106 which alerts the device communication system 100 that the selective call device 106 is within radio range of the radio communication system 100. An unsolicited message can include a request to transmit a scheduled or demand response which can include data such as alphanumeric data and the schedule for transmissions including block-out periods. Unsolicited messages are transmitted, e.g., using the slotted ALOHA protocol. The inbound and outbound messages are included in outbound radio signals transmitted from, and inbound radio signals received by, a conventional antenna 104 coupled to the radio frequency transmitter/receiver 103.

The secondary communication system 120 similarly comprises a system controller 122, a transmitter/receiver 124 and an antenna 126. The secondary communication system operates on a different frequency from the primary communication system 110 and is preferably independent of the primary communication system 110. The secondary communication system 120 can be operated on a different protocol having different encoding and decoding schemes. The selective call device 106 acquires the secondary communication system 120 preferably by tuning or "listening" to the frequency of the secondary communication system 120 during a predefined or predetermined time slot or period. Therefore when the selective call device 106 requests information or when the secondary communication system 120 is transmitting information to the selective call device 106, the information is transmitted in accordance with schedule or block-out periods that were communicated to the secondary communication system 120 from the selective call device 106. The block-out periods are consistent with the times during which the selective call device 106 are required or expected to be tuned (or listening) to the primary communication system 110 or any other times during which the selective call device 106 is not available to monitor or receive information from the secondary communication system 120. The details of the block-out period will be discussed in further. It should be noted that the system controllers 102, 122 are capable of operating in a distributed transmission control environment that allows mixing conventional cellular, simulcast, satellite, or other coverage schemes involving a plurality of radio frequency transmitter/receivers 103, 124 conventional antennas 104, 126, for providing reliable radio signals within a geographic area as large as a worldwide network. Moreover, as one of ordinary skill in the art would recognize the telephonic and selective call device communication system functions can reside in separate system controllers 102, 122 that operate either independently or in a network fashion.

Each of the selective call devices 106 assigned for use in the radio communication system 100 has at least one address assigned to the primary communication system 110 which is a unique selective call address and at least one address that can be assigned to the secondary communication system 120. The same address could also be assigned to the primary and secondary communication systems. The selective call address enables the transmission of a message from the system controller 102 only to the addressed selective call device 106.

Figure 2:
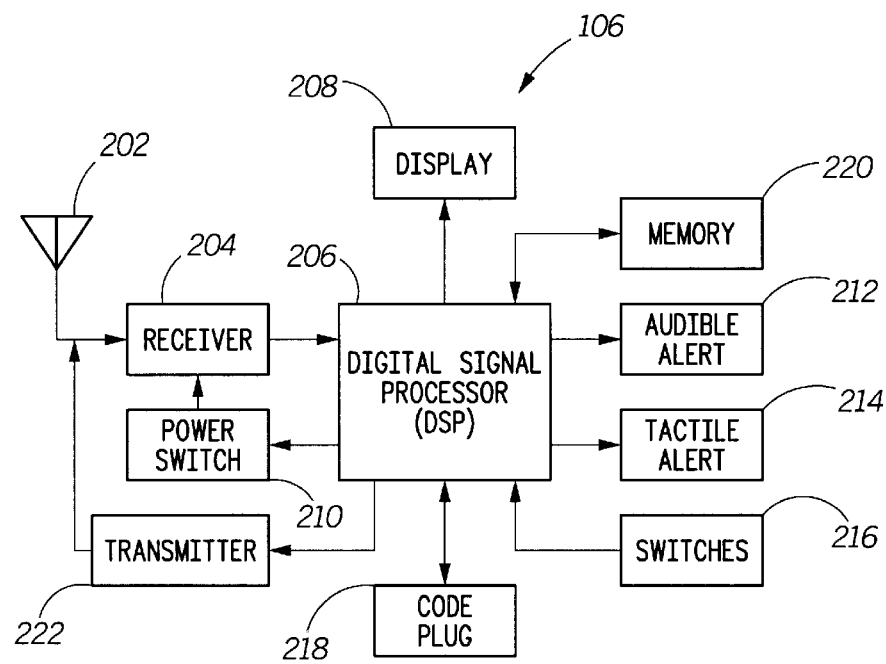
FIG. 2 is an electrical block diagram of a selective call device according to the preferred embodiment of the present invention.

Referring to FIG. 2, an electrical block diagram of a selective call device is shown in accordance with the preferred embodiment of the present. It will be appreciated that the selective call device 106 is one of several types of radios, including two-way selective call devices, conventional mobile radios, conventional or trunked mobile radios that have a data terminal attached thereto, or which optionally have data terminal capability designed in. Each of the selective call devices 106 assigned for use in the radio communication system 100 has an address assigned thereto which is unique to the selective call device 106. The address enables the transmission of a message from the system controllers 102, 122 to be received only by the addressed or designated selective call device, and identifies messages and responses received at the system controllers 102, 122 from the selective call device 106. Furthermore, each of one or more of the selective call devices 106 can have a unique telephone number assigned thereto, the telephone number being unique within the PSTN 108 (FIG. 1). When the system controllers 102, 122 receive an inbound message from a selective call device 106, the system controllers 102, 122 establish communication and check by well known techniques if the requesting selective call device 106 is a valid subscribing unit within the communication system 100. Preferably, the selective call device 106 is able to operate on multiple frequencies of one or more communication systems. The selective call device 106 (e.g., a selective call receiver with an acknowledge-back transmitter) can transmit an inbound signal in response to the receipt of a message from the communication system 100. The outbound signal from, e.g., the system controller can be received on any signaling protocol, preferably the FLEX® protocol. The selective call device 106 comprises an antenna 202 that provides a radio frequency (RF) carrier signal to the receiver 204. The receiver 204 generates a recovered signal suitable for processing by a digital signal processor ("DSP") 206 in a manner well known to one of ordinary skill in the art. The DSP 206 performs functions such as encoding and decoding messages and controlling the operation of the selective call device 106 well known to one of ordinary skilled in the art. The DSP 206 processes the received signal to decode the address and compares the decoded address with one or more predetermined addresses contained in a memory, for example, a codeplug 218. When the addresses are substantially similar, the user is alerted that a signal has been received either by an audio alert (e.g., a speaker or transducer) 212 or a tactile alert (e.g., a vibrator) 214. The received signal may also include optional message data directed to some selective call device 106. Also, if the selective call device 106 includes an optional voice output, recovered audio components of the received RF signal may be presented. For a message selective call device, the recovered message is stored in a memory 220 for subsequent presentation by an output device which for example is a display 208. The output device will automatically, or when manually selected by switches 216, present the message, such as by displaying the message on the display 208.

According to the preferred embodiment of the present invention, when the selective call device 106 is assigned to the primary communication system 110, it is assigned to, e.g., a time slot position during which the selective call device is able to receive messages. The selective call device 106 without any involvement or without informing the primary communication system 110 can arrange to receive information from another communication system, e.g., a secondary communication system 120 that is preferably independent of the primary communication system 110. The selective call device 106 knows its time slot assignment. The time-slot assignment is coordinated with a common time base, e.g., Global Positioning System (GPS), to facilitate coordination between the primary and secondary communication systems. Therefore, since the selective call device 106 is coordinated on a common time base, it able to inform the secondary communication system 120 of the time period during which it will not be able to receive or monitor the secondary communication system 120 because the selective call device 106 is busy monitoring its primary communication system 110.

For an acknowledge-back selective call receiver 106 (or two-way selective call device), a signal is transmitted either automatically or manually in response to the receipt of the selective call message (or signal) by the selective call device 106. The user, in the case of a manual response, uses the switches 216 to select a message from, for example, one of a number of pre-stored messages in memory 220 to be sent to the originator. The message is then encoded by the DSP 206 and passed to a transmitter 222 for transmission by the antenna 202. Preferably, the message is modulated by the DSP 206 and encoded in a manner well known in the art. If a user desires a particular information service that is not available, e.g., on the primary communication system 110, a request can be sent to the secondary communication system 120. The request will include, e.g., the type of information requested, the address of the selective call device 106, and the block-out time. The block-out time preferably includes the time when the selective call device 106 will be busy listening to the primary communication system or any other time that the selective call device is be unable to monitor the secondary communication system 120.

Figure 3:
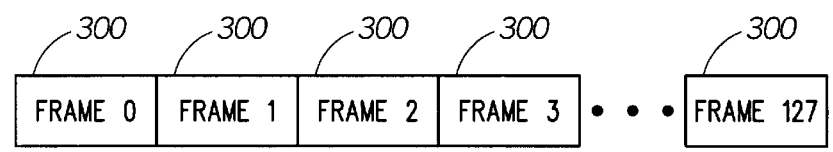
FIGS. 3 and 4 are timing diagrams illustrating the transmission format of the FLEX® protocol in accordance with the preferred embodiment of the present invention.
Figure 4:
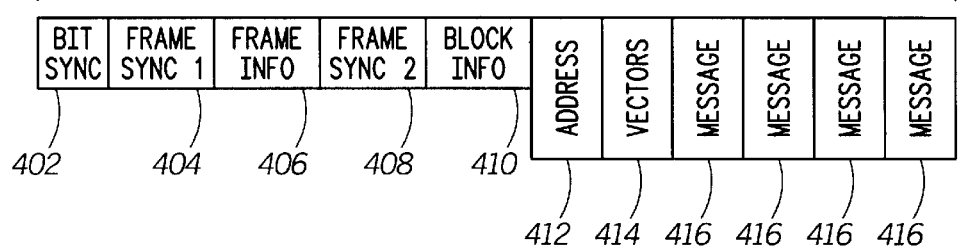

FIG. 3 shows a timing diagram of a synchronous signal in accordance with the preferred protocol. The selective call signal, e.g., FLEX® signal protocol, comprises a number of, preferably one-hundred-twenty-eight (128), message packets or frames 300. The frame 300 corresponds to a time-slot assigned to a selective call device. Therefore, a selective call device that is assigned to FRAME 2 will not be able to monitor or receive any message from, e.g., the secondary channel during the time when FRAME 2 is being transmitted. Each frame 300 is preferably 1.875 seconds in duration and has a preferred base data rate of 6400 bits per second. Although, it will be appreciated that other data rates can be used including the ability to use multiple data rates. Refer-ring to FIG. 4, each frame 300 comprises a bit sync signal 402, preferably 32 bits of alternating 1,0 pattern, followed by a frame sync #1 signal 404 preferably one of several predetermined thirty-two bit words, and a frame info signal 406, preferably one thirty-two bit word having twenty-one variable information bits containing information such as a cycle number and a frame number. The bit sync signal 402 provides bit synchronization to the selective call device 106 while the frame sync signal 404 provides frame synchronization and includes a signal indicative of the data rate of the message information.

Following the frame info word 406 is a frame sync #2 408. Following the frame sync #2 408 is a block info word (BIW) signal 410 including information such as the number of priority addresses, end of block information field, vector start fields and the system collapse value mask. The system collapse mask is the same for each 128 frames of a selective call transmission, and is used by the selective call device 106 to operate in another battery saving mode or period possibly different from the battery saving mode or period preprogrammed in the selective call device 106. The code word of each frame 300 is preferably encoded as 31,21 Bose-Chaudhuri-Hocquenghem (BCH) code words having twenty-one information bits and ten parity bits generated according to the well-known BCH algorithm. An additional even parity bit extends the word to a 32,21 code word. The addresses are located in block 412 and the vectors pointing to the messages, if applicable, are located in block 414 and the messages are located in the remaining blocks 416. Preferably, all of the address signals within the frame are located in a first portion 412 and the information signals are located in a subsequent portion of the block 416. Words 412–416 are shown in a vertical orientation to indicate that these words may be interleaved in order to improve the immunity of the transmission to burst errors. It is understood by one of ordinary skill in the art that interleaving can be modified or eliminated.

Referring to FIGS. 5 and 6, timing cycles are shown designating schedules for message transmissions according to the preferred embodiment of the present invention. The timing cycle illustrates the concepts of the invention and the thirty (30) second cycles with 16 frames are shown only for convenience. As is preferred, when both the primary and secondary communication systems are aligned to GPS, the secondary communication system 120 needs no further synchronization to determine the time slots or periods to transmit messages to the selective call device 106. FIG. 5 illustrates that FRAME 2 is blocked-out and that FRAMES 0, 1, and 3–15 are available for transmission by the secondary communication system 120. Therefore, when the selective call device is assigned to FRAME 2 of the primary communication system 110 and the time is synchronized to GPS, the secondary communication system 120 can transmit information during all the other time-period or slots, e.g., FRAMES 0, 1 and 315. The time cycle shown in FIG. 6 illustrates that selective call device 106 is assigned to FRAME 2 of the primary communication system. During the time period of FRAME 2, the selective call device will be tuned to the primary communication system 110 and will not received any other information that is transmitted to it by the secondary communication system 120 or any other communication system. Therefore, by synchronizing both the primary and secondary communication systems 110, 120 to GPS, the selective call device 106 needs to communicate to the secondary communication system 120 the block out time period, e.g., FRAME 2 time period. The secondary communication system 120 will therefore know that it can transmit information to the selective call device 106 during all other time periods, e.g., FRAMES 0, 1, and 3–15 according to the thirty second cycle. One skill in the art understands that allowances are made because it takes time for the selective call device to warm-up and become synchronized to another frequency. In this way, the selective call device 106, based on its time slot assignment, can acquire the frequency of and communicate with at least a secondary or alternate communication system by providing it with the time periods during which it is not to transmit any information to the selective call device 106. The selective call device 106 can instead inform the secondary communication system of the time slots during which it is authorized to transmit information or messages to the selective call device 106. Since both the primary and the secondary communication systems are synchronized to a common time base, the selective call device is able to monitor both the primary and secondary channels without missing any messages because the secondary communication system 120 knows when it is authorized to transmit information to the selective call device 106. Even when the selective call device requests information from the secondary communication system, the secondary communication system knows not to transmit any information during the time slot corresponding to, e.g., FRAME 2 because the selective call device 106 will be busy monitoring the primary communication channel. The selective call device is also synchronized to the same common time base, e.g., GPS, so the selective call device is able to switch between the primary and secondary communication system without missing any transmission from either system, if such transmission are made according to the common time base and within the schedule time periods.

Referring to FIG. 7, a flow diagram is shown illustrating a method for monitoring at least two communication systems having at least two frequencies in accordance with the preferred embodiment of the present invention. The selective call device 106 powers-up and completes initialization which includes, among other things, determining the frequency of the primary communication system (channel), step 700. After the selective call device 106 tunes to the frequency of the primary channel, it begins to receive control information to achieve synchronization with the primary communication system, step 702. Following synchronization, the selective call device 106 continues to receive information to, among other things, determine its time-slot assignment according to the FLEX protocol, step 704. In step 706, the selective call device 106 processes scheduling information on the primary channel. The scheduling information enables the selective call device to transmit or transfer timing information about its primary network to a secondary network. The secondary network uses the timing information to determine "block-out" data transmission times from the time periods during which it would normally communicate with the selective call device 106. It is appreciated by those skilled in the art that the timing information (block-out or schedule times) can be determined for a single transaction (or transmission) or it could be determined for continuous communication by the secondary communication with the selective call device.

The selective call device 106 calculates the timing information with reference to a common time base, e.g., GPS, step 708. It is understood that both the primary and secondary communication systems are already synchronized to the GPS time base. Therefore when the selective call device 106 receives its timing information from the primary communication system, it needs to calculate the time periods during which is will be able to monitor the secondary channel without interfering with its time slot assignments or any other activities associated with the primary communication system. The selective call device 106 then scans to the frequency of the secondary channel and synchronizes to the channel of the secondary communication system, step 710. After becoming synchronized to the secondary channel, the selective call device 106 transmits or sends timing information which includes block-out times to the secondary communication channel on the GPS time base, step 714. Preferably, but not mandatory, the selective call device 106 waits until it receives a confirmation from the secondary channel that its has received the timing information for scheduling transmission, step 714. After sending the timing information to the secondary communication system, the selective call device returns to monitor the primary communication system in accordance with the timing information, step 716.

According to the invention disclosed herein, a selective call device 106 that subscribes to a primary communication system can establish a relationship with another communication system and be able to receive messages during a specific time period which occurs in a period related to the synchronous repetition rate of the primary communication system. The selective call device informs the secondary communication system, preferably over-the-air, of the required timing relationship on the primary communication system so that the selective call device can monitor the secondary communication system when it is not required to monitor the primary communication. Additionally, a selective call device can receive messages on a primary channel and still be able to make inquires or requests for information while providing timing relationship to the communication system from which the request is being made to ensure that the selective call device will be monitoring the communication during the time when the information will be sent.

In this way, the selective call device is able to monitor more than one independent service providers and be able to receive information from both service providers. The selective call device establishes a timing relationship on, e.g., GPS so that the selective call device and the at least two independent networks are synchronized to the same time base without requiring a communication between the at least two networks. The selective device call acts as a controller that informs the other networks of the time period during which they are permitted to communicate with the selective call device. This eliminates any possibility that the selective call device will miss any messages irrespective of which network is transmitting such messages because the networks will know before hand the time slots during which it is permitted to send information and the selective call device knows when it is supposed to tune to particular frequencies of different networks. In summary, a selective call device that monitors at least two communication systems and comprises a receiver for receiving information from a first communication system and a processor for referencing a time slot assignment on the first communication system to a common time base. The processor calculates timing information relating a common time base and a transmitter transmits the timing information to the second communication system to inform the second communication system when to transmit information to the selective call device with reference to the common time base. The processor then waits for a response from the second communication system indicating that the timing information was received. The timing information indicates when the second communication system should respond with the requested information while the processor periodically causes the transmitter and receiver to communicate with the first and second communication according to the timing information referencing the common base time. The transmitter also transmits a request for information to the second communication system. The timing information comprises the time slot assignment according to the common time base, a first time period in reference to the common time base to enable the selective call device to monitor the first communication system, and a second time period to enable the selective call device to monitor the second communication system. The timing information can also include block out times when the second communication system should not communication with the selective call device or a time period when the second communication system is permitted to communicate with the selective call device. The processor also calculates an additional time so that the selective call device can monitor another communication system in addition to the first communication system and the second communication system.

We claimed:

1. A method in a selective call device for monitoring at least two communication systems, comprising the steps of:

communicating with a first communication system of the at least two communication systems;

determining a time slot assignment on the first communication system;

calculating timing information relating a common time base;

acquiring a frequency of a second communication system of the at least two communication systems; and transmitting the timing information to the second communication system for informing the second communication system when to transmit information to the selective call device with reference to the common time base.

2. The method according to claim 1 further comprising a step of waiting for a response from the second communication system indicating that the timing information was received.

3. The method according to claim 1 wherein the step of transmitting includes the selective call device transmitting a request for information to the second communication system including the timing information indicating when the second communication system should respond with a requested information.

4. The method according to claim 3 wherein the selective call device periodically communicates with the first communication system and the second communication system according to the timing information referencing the common base time.

5. The method according to claim 1 wherein the step of calculating the timing information further comprising the steps of:

equating the time slot assignment according to the common time base;

determining a time in reference to the common time base that the selective call device will be required to monitor a frequency of the first communication system; and calculating a time that the selective call device can monitor the second communication system.

6. The method according to claim 5 wherein the step of calculating calculates an additional time that the selective call device can monitor another communication system in addition to the first communication system and the second communication system.

7. A selective call device for monitoring at least two communication systems, comprising:

a receiver for receiving information from a first communication system;

a processor for referencing a time slot assignment on the first communication system to a common time base, the processor calculates timing information relating the common time base; and a transmitter for transmitting the timing information to a second communication system informing the second communication system when to transmit information to the selective call device with reference to the common time base.

8. The selective call device according to claim 7 wherein the processor waits for a response from the second communication system indicating that the timing information was received.

9. The selective call device according to claim 7 wherein the transmitter transmits a request for information to the second communication system including the timing information indicating when the second communication system should respond with a requested information.

10. The selective call device according to claim 7 wherein the processor periodically causes the transmitter and receiver to communication with the first communication system and the second communication system according to the timing information referencing the common base time.

11. The selective call device according to claim 7 wherein the timing information comprises a time slot assignment according to the common time base, a first time period in reference to the common time base to enable the selective call device to monitor the first communication system, and a second time period to enable the selective call device to monitor the second communication system.

12. The selective call device according to claim 7 wherein the timing information comprises block out times when the second communication system should not communication with the selective call device.

13. The selective call device according to claim 7 wherein the timing information comprises a time period when the second communication system is permitted to communicate with the selective call device.

14. The selective call device according to claim 7 wherein the processor calculates an additional time so that the selective call device can monitor another communication system in addition to the first communication system and the second communication system.

* * * * *